(12) United States Patent
Koka et al.

(10) Patent No.: US 9,710,809 B2
(45) Date of Patent: *Jul. 18, 2017

(54) METHOD AND SYSTEM FOR LICENSE SERVER SYNCHRONIZATION

(71) Applicant: Flexera Software LLC, Itasca, IL (US)

(72) Inventors: Vikram Venkata Koka, Fremont, CA (US); Ann Shvarts, San Jose, CA (US)

(73) Assignee: Flexera Software LLC, Itasca, IL (US)

( * ) Notice: Subject to any disclaimer, the term of this patent is extended or adjusted under 35 U.S.C. 154(b) by 261 days.

This patent is subject to a terminal disclaimer.

(21) Appl. No.: 14/161,513

(22) Filed: Jan. 22, 2014

(65) Prior Publication Data

US 2014/0136416 A1 May 15, 2014

Related U.S. Application Data

(63) Continuation of application No. 12/972,199, filed on Dec. 17, 2010, now abandoned.

(51) Int. Cl.
*G06Q 40/00* (2012.01)
*G06Q 20/38* (2012.01)
*G06Q 30/06* (2012.01)
*G06Q 50/18* (2012.01)

(52) U.S. Cl.
CPC ............ *G06Q 20/38* (2013.01); *G06Q 30/06* (2013.01); *G06Q 50/184* (2013.01)

(58) Field of Classification Search
None
See application file for complete search history.

(56) References Cited

U.S. PATENT DOCUMENTS

| | | | |
|---|---|---|---|
| 6,223,291 B1* | 4/2001 | Puhl et al. | 726/28 |
| 6,587,959 B1* | 7/2003 | Sjolander et al. | 714/4.5 |
| 7,343,297 B2* | 3/2008 | Bergler et al. | 705/59 |
| 7,376,584 B1* | 5/2008 | Weixel | 705/17 |
| 2002/0069172 A1* | 6/2002 | Omshehe et al. | 705/51 |
| 2003/0161476 A1* | 8/2003 | Fransdonk | G06Q 20/12 380/282 |
| 2005/0005098 A1* | 1/2005 | Michaelis et al. | 713/156 |

(Continued)

OTHER PUBLICATIONS

U.S. Appl. No. 12/972,199; Office Action mailed Apr. 7, 2014.
(Continued)

*Primary Examiner* — Paul R Fisher
(74) *Attorney, Agent, or Firm* — Michael A. Glenn; Perkins Coie LLP

(57) ABSTRACT

A method and system for license server synchronization are disclosed. According to one embodiment, a computer-implemented method comprises receiving a first capability request from a licensing server, transmitting a first capability response to the licensing server. The licensing server provides a second capability response to a device, and the second capability response is in response to a second capability request sent by the device to the licensing server. The second capability response includes one or more capabilities included in the first capability response. A server synchronization message is received from the licensing server and a request for payment is transmitted to a service provider, wherein the request for payment is generated based on the server synchronization message.

11 Claims, 14 Drawing Sheets

(56) References Cited

U.S. PATENT DOCUMENTS

| | | | |
|---|---|---|---|
| 2005/0257072 A1* | 11/2005 | Cross | H04L 63/06 713/193 |
| 2006/0015502 A1* | 1/2006 | Szucs | 707/9 |
| 2008/0046961 A1* | 2/2008 | Pouliot | 726/1 |
| 2008/0215758 A1* | 9/2008 | Gerdes et al. | 709/248 |
| 2009/0300137 A1* | 12/2009 | Tyhurst et al. | 709/217 |
| 2012/0158415 A1 | 6/2012 | Koka | |

OTHER PUBLICATIONS

U.S. Appl. No. 12/972,199; Final Office Action mailed Feb. 25, 2013.
U.S. Appl. No. 12/972,199; Office Action mailed Aug. 9, 2012.
U.S. Appl. No. 12/972,199; Office Action mailed Nov. 6, 2014.

* cited by examiner

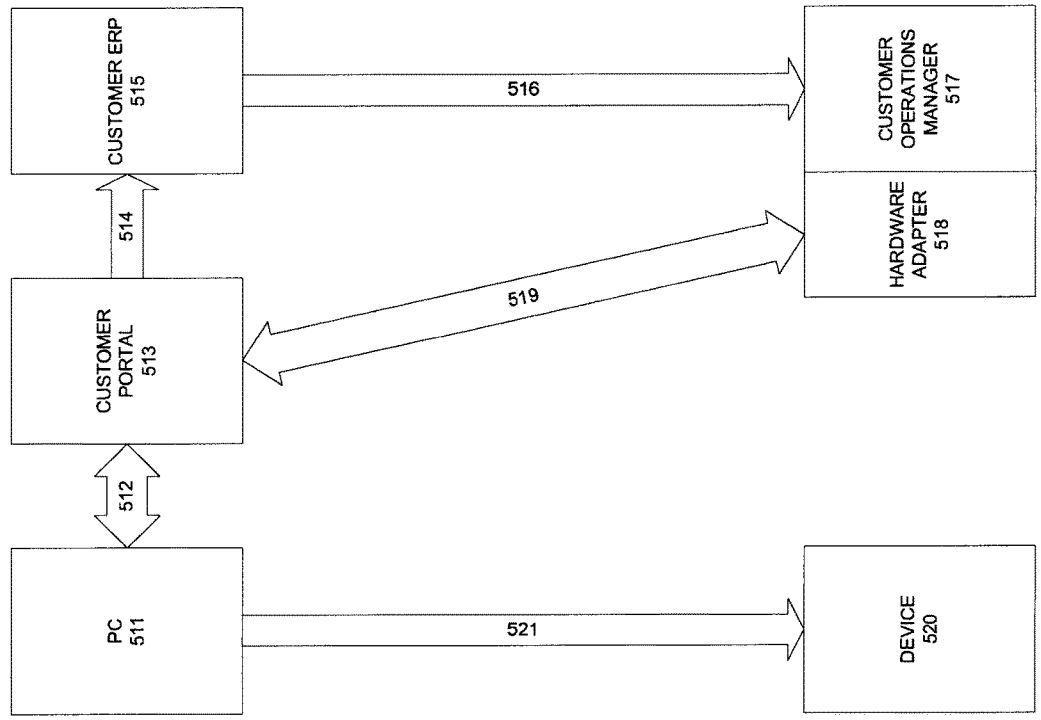
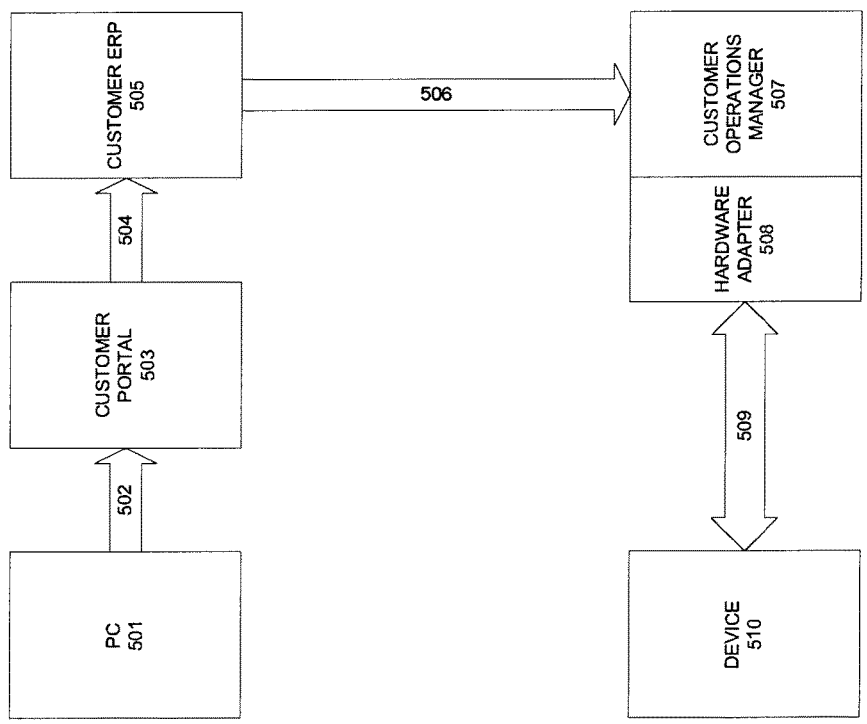

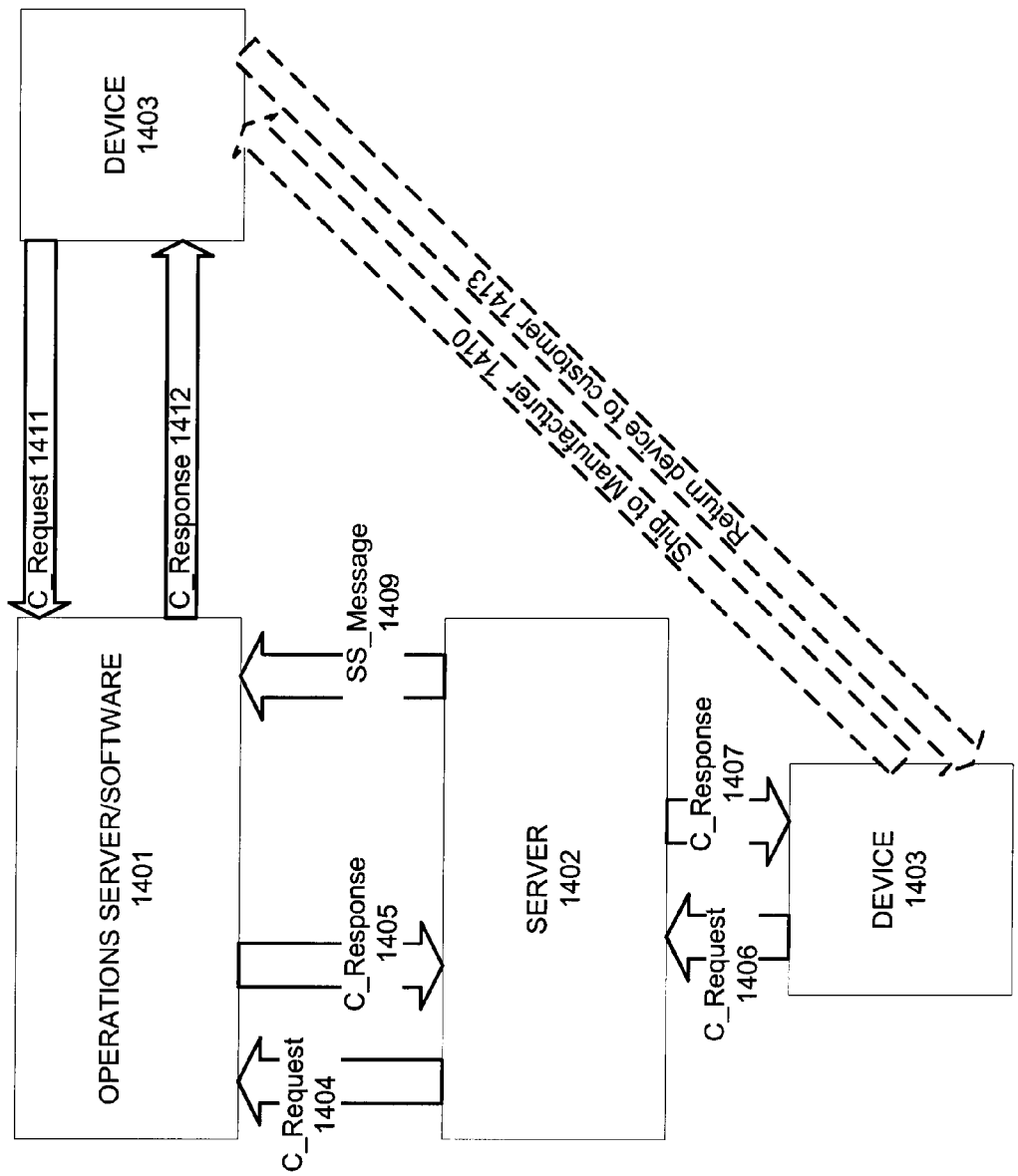

METHOD AND SYSTEM FOR LICENSE SERVER SYNCHRONIZATION

CROSS-REFERENCE TO RELATED APPLICATIONS

The present application claims the priority benefit of U.S. patent application Ser. No. 12/972,199 filed Dec. 17, 2010, the disclosure of which is incorporated herein by reference.

BACKGROUND OF THE INVENTION

Field of the Invention

The field of the invention relates generally to computer systems and more particularly relates to a method and system for license server synchronization.

Description of the Related Art

Device manufacturers commonly sell products into different markets or price points, though the devices have similar bills of material and/or manufacturing cost. The manufacturer differentiates the devices by the capabilities they offer, for example a device with fewer capabilities may sell for a lower price than the same device with additional or more sophisticated capabilities. Issues arise when customers become interested in upgrading a device for more capabilities. A customer may have initially desired a device with fewer capabilities at the lower price point, and later decided the more sophisticated (and, consequently perhaps, more expensive) suite of capabilities is necessary or preferred. In terms of licensing, rights are defined on a host and licensed software gets tied to a hardware identity, limiting capability upgrade opportunities or hardware substitution.

Further, a customer may purchase a device through a service provider rather than from a manufacturer. Capabilities are enabled on the device per an agreement with the service provider and the manufacturer. If the customer experiences issues with the device, the manufacturer has no way of knowing what capabilities the device should have enabled because that is handled by the service provider.

SUMMARY OF THE PRESENTLY CLAIMED INVENTION

A method and system for license server synchronization are disclosed. According to one embodiment, a computer-implemented method comprises receiving a first capability request from a licensing server, transmitting a first capability response to the licensing server. The licensing server provides a second capability response to a device, and the second capability response is in response to a second capability request sent by the device to the licensing server. The second capability response includes one or more capabilities included in the first capability response. A server synchronization message is received from the licensing server and a request for payment is transmitted to a service provider, wherein the request for payment is generated based on the server synchronization message.

The above and other preferred features, including various novel details of implementation and combination of elements, will now be more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the teachings herein.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

FIG. 5A illustrates an exemplary online device activation process for use with the present system, according to one embodiment.

FIG. 5B illustrates an exemplary offline device activation process for use with the present system, according to one embodiment.

FIG. 14 illustrates an exemplary device state restoration process for use with the present system, according to one embodiment.

The above and other preferred features, including various novel details of implementation and combination of elements, will now be more particularly described with reference to the accompanying drawings and pointed out in the claims. It will be understood that the particular methods and systems described herein are shown by way of illustration

DETAILED DESCRIPTION

As A method and system for license server synchronization are disclosed. According to one embodiment, a computer-implemented method comprises receiving a first capability request from a licensing server, transmitting a first capability response to the licensing server. The licensing server provides a second capability response to a device, and the second capability response is in response to a second capability request sent by the device to the licensing server. The second capability response includes one or more capabilities included in the first capability response. A server synchronization message is received from the licensing server and a request for payment is transmitted to a service provider, wherein the request for payment is generated based on the server synchronization message.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus.

The methods presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 1:
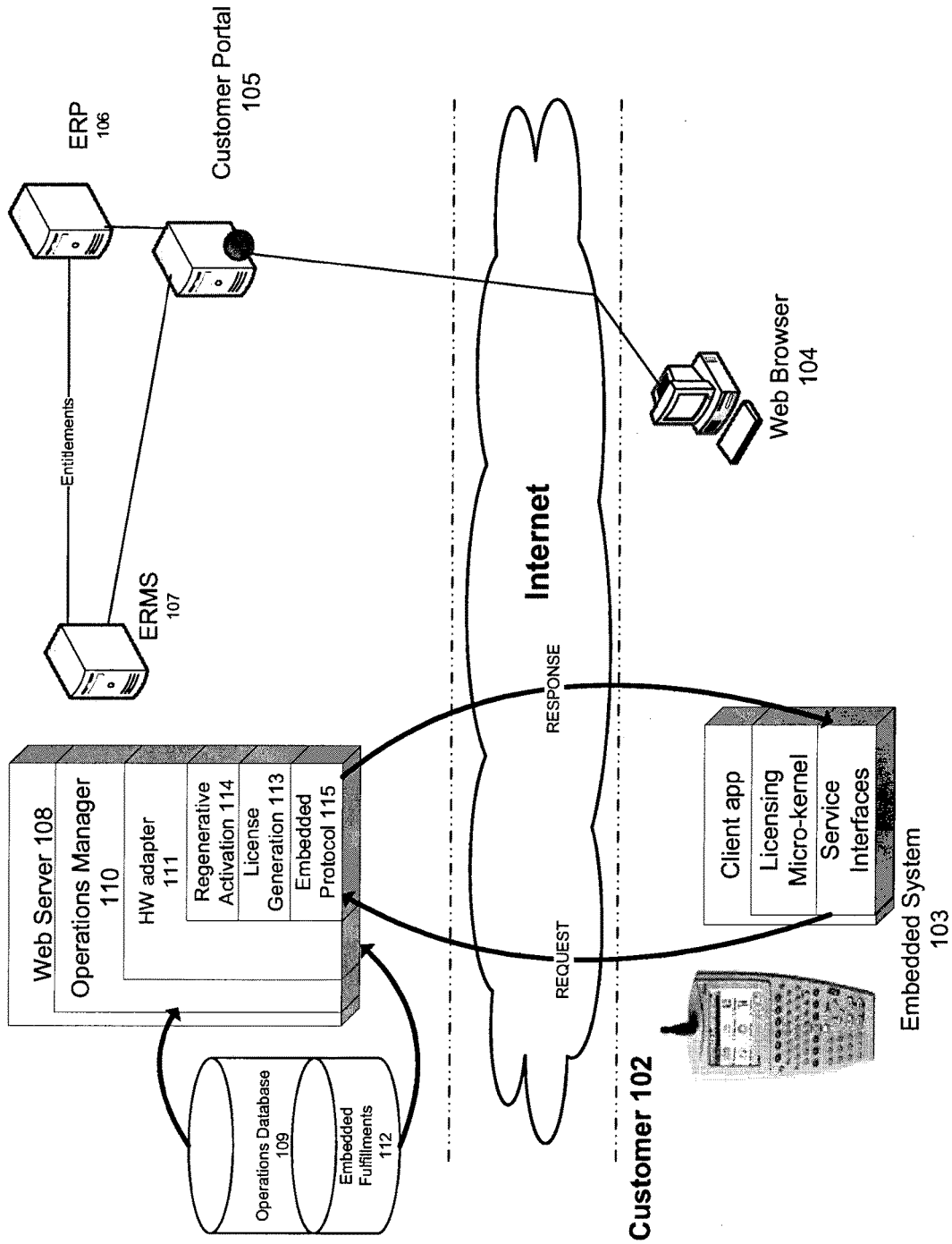
FIG. 1 illustrates an exemplary system level architecture for use with the present system, according to one embodiment.

FIG. 1 illustrates an exemplary system level architecture for use with the present system, according to one embodiment. A hardware manufacturer 101 grants licensing rights to a customer 102 possessing a device such as embedded system 103. The embedded system 103 includes a device and a client architecture made up of a client application, licensing micro-kernel, and service interfaces such as in FIG. 2 described below.

The customer 102, via web browser 104, accesses a customer portal 105 hosted by the hardware manufacturer 101. Through the customer portal 105 the customer 102 may request capabilities by communicating with the enterprise resource planner (ERP) 106 and pay for the capabilities desired on the customer's embedded system 103. The capabilities desired may be initial functional capabilities for the embedded system 103 and they may also be an upgrade in functionality for an already deployed embedded system 103. The ERP 106 communicates to the entitlement relationship management system (ERMS) 107 the entitlements for the embedded system 103. The customer 102 is then instructed to refresh (or restart or automatically restart after a pre-configured interval based on manufacturer preference) the embedded system 103, and upon reconnection, the embedded system 103 requests instructions from the hardware adapter 111 on the operations manager 110 regarding what capabilities should exist on the system.

The hardware adapter 111 responds with a capability response, and the embedded system 103 functions with the appropriate capabilities it is licensed to utilize. The operations manager 110 communicates regularly with an operations database 109 to store and retrieve licensing information. The hardware adapter 111 is also in communication with an embedded fulfillments database 112 for storage and retrieval of what capabilities have been fulfilled on a device. The hardware adapter 111 handles license generation 113 that generates licenses in the binary format accepted by the embedded system 103. This format is different from a regular license file (which may be plain text) or regular activation (xml) formats. Regenerative activation 114 is also handled by the hardware adapter 111, and regenerative activation 114 involves regenerative logic that restores a licensing state. As an example, in a secure re-host scenario (or transfer of capabilities from one device to another), this block verifies that the original device released its capabilities before granting the capabilities to a replacement device. The hardware adapter 111 also contains an embedded protocol 115 for interfacing with a device or embedded system 103. The embedded protocol 115 decodes and encodes requests and responses based on the protocol defined for the embedded system 103.

Figure 2:
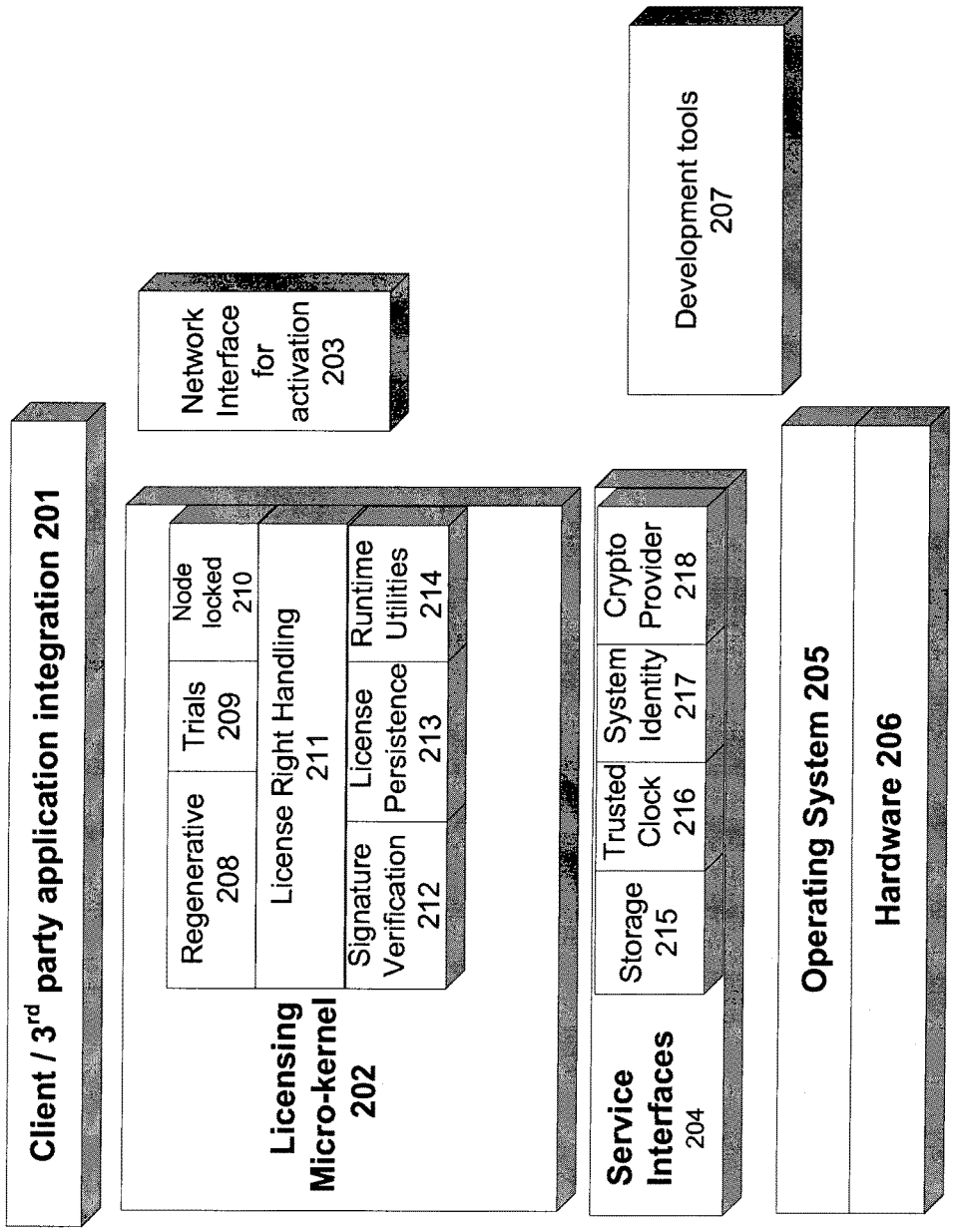
FIG. 2 illustrates an exemplary client architecture for use with the present system, according to one embodiment.

FIG. 2 illustrates an exemplary client architecture for use with the present system, according to one embodiment. A client or third party application integration 201 may include a licensing micro-kernel 202, service interfaces 204, and uses the operating system 205 and system hardware 206. Device activation involves a network interface 203 for communication between the embedded system 103 and the provider server. The network interface 203, in one embodiment, is delivered to the customer by the provider and is overwritten by the customer based on device configurations. Various development tools 207 may also be in place, including in one example a test server or a license conversion utility to assist in development of the license enabled application. In one embodiment, the licensing micro-kernel 202 is delivered by the provider as pre-built libraries, with services included that can be broken out as separate services such as signature verification 212, license persistence 213, and runtime utilities 214.

Signature verification 212 is a logical block that verifies signatures on the individual feature lines contained within various license rights. Signature verification 212 assures the authenticity of the feature lines and prevents license tampering. License persistence block 213 securely stores regenerative and trial license rights on an embedded device 103. Regenerative license rights are stored on the device so the capabilities are available in-between regenerations from the management server. Information about trial license rights stored on the embedded system 103 to ensure proper expiration. Runtime utilities 214 represent wrappers around runtime functions, the wrappers are used to provide encapsulation from various implementations of customizable operating systems calls. In one embodiment, the licensing micro-kernel 202 handles license rights (license right handling 211), and processes and maintains license rights of various models. Some supported license models may include trials 209, regenerative 208, and node locked 210. The trials 209 license model includes license rights available for a specified duration of time. The regenerative 208 license model specializes in the continuous license rights updates from the management server to the embedded system 103. The node locked 210 license model specializes in the license rights locked to a given device or node. Other interfaces for storage 215, time (verification of a trusted clock 216), system identity 217 verification, and cryptography (crypto provider 218) can be delivered by the provider and overwritten by the customer/manufacturer based on particular device configurations. Storage 215 block stores license rights on the device.

A reference implementation is provided by the provider for the most common embedded operating system, though the manufacturer may way to provide its own implementation to control secure location of the storage and take advantage of the device file system. The trusted clock 216 provides the accurate system time of the device. This helps prevent unauthorized use of expired licenses. The system identity block 217 accesses the device identification. Block 217 uses manufacturer specific implementations because various manufacturers have unique ways of identifying devices. The crypto provider block 218 handles the cryptography needs of the license-enabled application.

Figure 3:
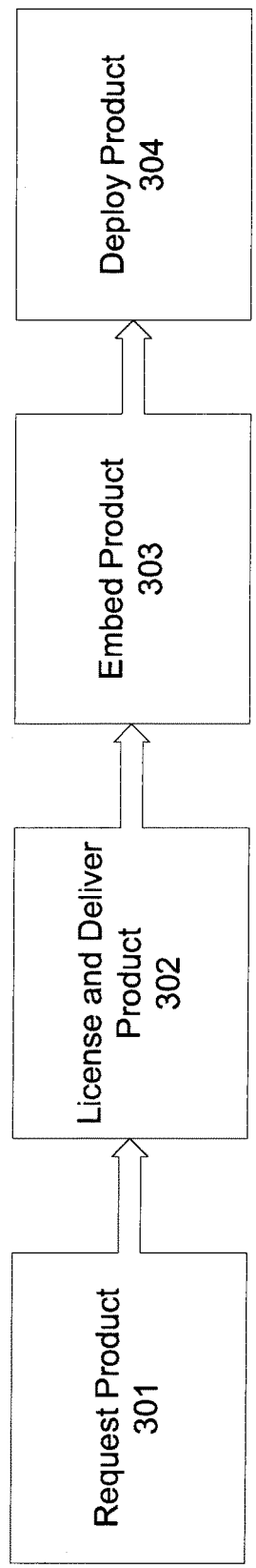
FIG. 3 illustrates an acquisition and deployment process of an embedded regenerative licensing product from a provider to a manufacturer for use with the present system, according to one embodiment.

FIG. 3 illustrates an acquisition and deployment process of an embedded regenerative licensing product from a provider to a manufacturer for use with the present system, according to one embodiment. A device manufacturer requests the embedded regenerative licensing product 301 from a provider. Upon completing any necessary transaction details, the provider licenses and delivers the product 302 to the device manufacturer. The device manufacturer may then embed the product 303 on any of its intended devices (in any customized implementation as is possible), and deploy the product 304 for use on its devices in the field.

Figure 4:
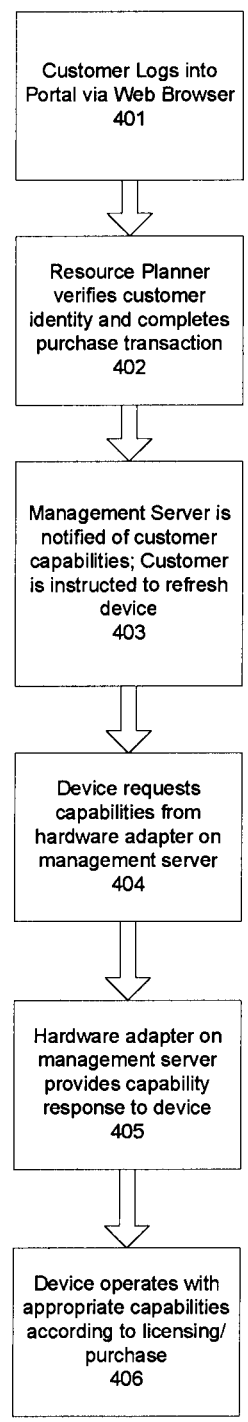
FIG. 4 illustrates an exemplary device licensing process for use with the present system, according to one embodiment.

FIG. 4 illustrates an exemplary device licensing process for use with the present system, according to one embodiment. A customer logs into a portal via web browser 401. A resource planner system then verifies the customer identity and assists in completing a purchase transaction 402. A management server is notified of purchased or otherwise authorized device capabilities for the customer and an associated device. The customer is instructed to refresh the device 403. Upon refresh, the device sends a request to a hardware adapter on the management server for the capabilities it should enable 404. The hardware adapter responds with a capability response to the device 405. The device can then be disconnected from the management server and continues to operate with the appropriate capabilities according to licensing 406.

FIG. 5A illustrates an exemplary online device activation process for use with the present system, according to one embodiment. A device enable transaction 502 is initiated from a customer PC 501 through a customer portal 503. The customer portal continues to pass the enable transaction request to a customer ERP 505, which in turn notifies a customer operations manager 507 what capabilities a device is entitled to. The device 510 connects 509 to the hardware adapter 508 to request and receive capabilities. A device capability request, generated on device 510, includes the unique identifier for device 510 and the time when the last capability response processing took place. The request is encoded and signed so the hardware adapter 508 on the operations manager 507 can verify the authenticity of the request. The hardware adapter 508 can match the timestamp included in the device capability request with the capability response it may have generated earlier for the specific device 510 and derive the device's 510 licensing state.

The hardware adapter 508 interfaces with the customer operations manager 507 for appropriate capability entitlements for the device 510. The hardware adapter 508 communicates 509 a capability response to the device 510. Capability responses are generated by the hardware adapter 508 on the operations manager 507. A capability response contains the hardware device 510 unique identifier, the list of all products and features the device 510 is entitled to and the time when the response was generated. The timestamp included in the capability response is universal time. The capability response is also encoded and signed so that the device 510 can verify its authenticity. The device 510 will only process a capability response that matches its unique identifier. The timestamp in a capability response is compared to the most recently processed request's timestamp, and the device 510 only processes responses that were generated later than the one it has already processed. When the device 510 processes a capability response, the information from the response may overwrite licensing information from the previous response. This way the capability response can be used to add new functionality to the device 510, or remove or modify existing functionality on the device 510.

FIG. 5B illustrates an exemplary offline device activation process for use with the present system, according to one embodiment. A customer PC 511 communicates 512 a device enable request through the customer portal 513. The customer portal 513 continues to pass the enable transaction request to a customer ERP 514, which in turn communicates a notification 516 to a customer operations manager 517 indicating what capabilities a device is entitled to. The customer PC 511 also communicates a portal capability request 512 for the offline device 520 through the customer portal 513 to a hardware adapter 518. The hardware adapter 518 processes the portal capability request. Unlike a device capability request the hardware adapter 518 cannot make assumptions about the device 520 licensing state. The hardware adapter 518 on the customer operations manager 517 communicates 519 with the customer portal 513 to pass a capability response to the PC 511. The device 520 then may be activated using any communication 521 mechanism (e.g. a USB storage device, as an example) between the device 520 and the PC 511, and no response is necessary after activation. A portal capability request, generated via the portal 513 rather than the device 520, includes the unique identifier for the device 520. Verification of the portal capability request's authenticity can be limited to portal user name and password protection, in one embodiment.

Figure 6B:
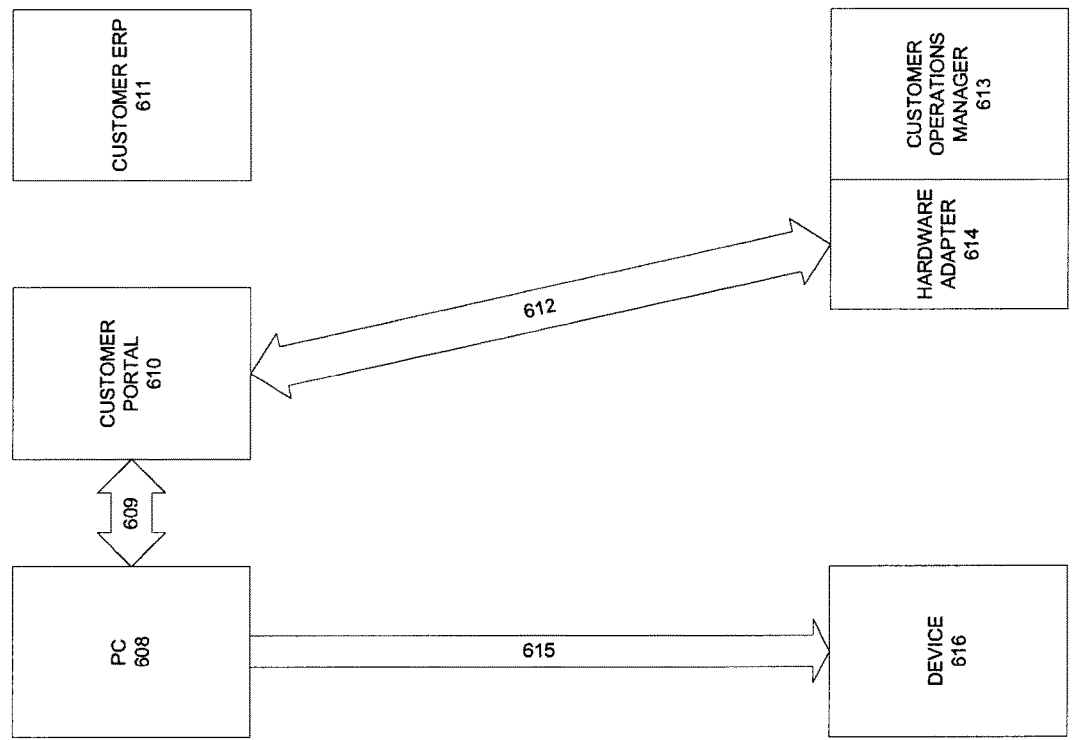
FIG. 6B illustrates an exemplary offline device update process for use with the present system, according to one embodiment.
Figure 6A:
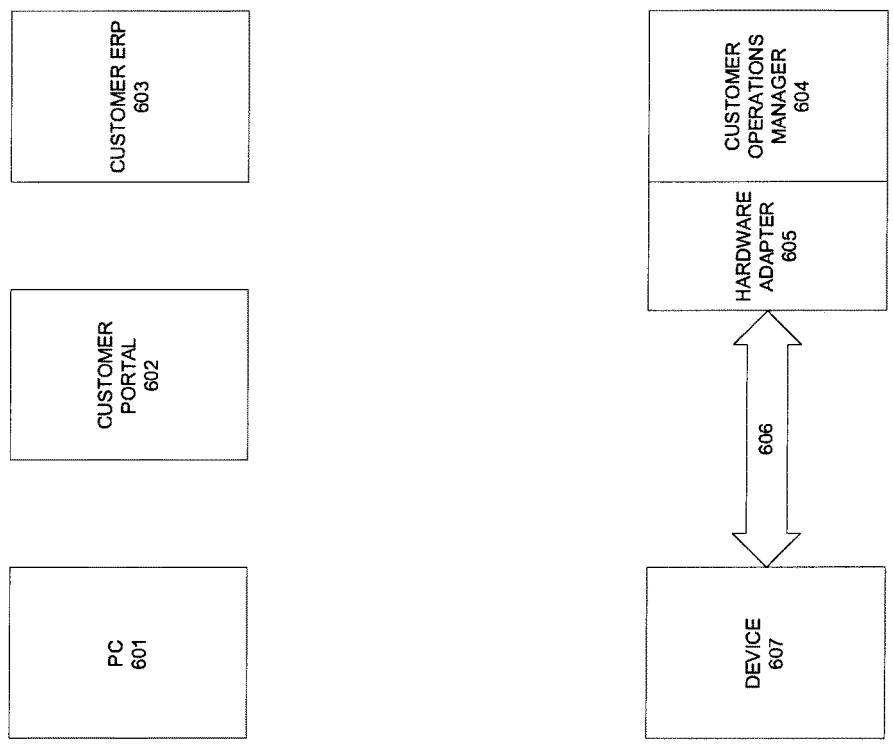
FIG. 6A illustrates an exemplary online device update process for use with the present system, according to one embodiment.

FIG. 6A illustrates an exemplary online device update process for use with the present system, according to one embodiment. When a device 607 is online, direct communication 606 may occur between the device 607 and the hardware adapter 605 on the customer operations manager 604. The device 607 sends a device capability request to the hardware adapter 605, and the hardware adapter responds with a capability response. The customer PC 601, customer portal 602, and customer ERP 603, do not need to be involved in the online device 607 update process, according to one embodiment.

FIG. 6B illustrates an exemplary offline device update process for use with the present system, according to one embodiment. A customer PC 608 communicates 609 through the customer portal 610 a portal capability request.

A capability response contains a hardware device unique identifier, the list of all products and features the device is entitled to and the time when the response was generated. The customer portal 610 communicates 612 with the hardware adapter 614 on the customer operations manager 613, passing along the portal capability request. The hardware adapter 614 communicates a capability response 612 back to the customer portal 610 which is then passed back 609 to the customer PC 608. The device 616 can then be updated through any form of communication 615 (e.g. a USB storage device, as an example) between the device 616 and the PC 608.

Figure 7B:
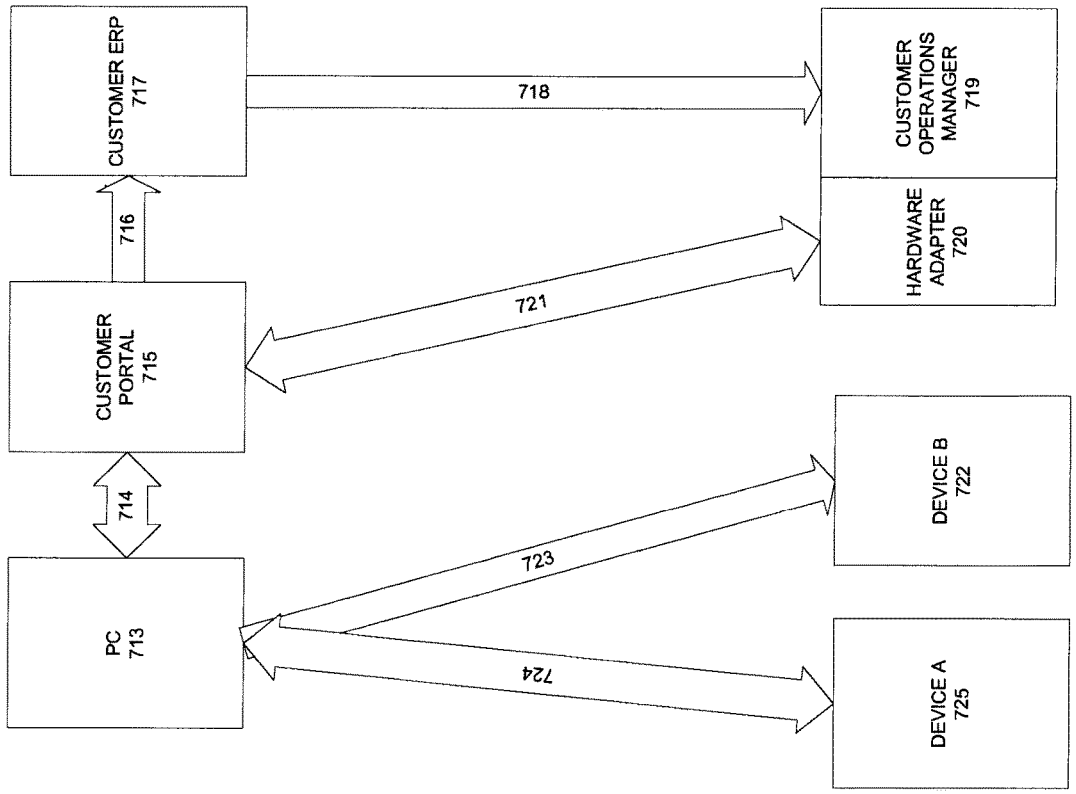
FIG. 7B illustrates an exemplary offline device rehost, or transfer of capabilities, process for use with the present system, according to one embodiment.
Figure 7A:
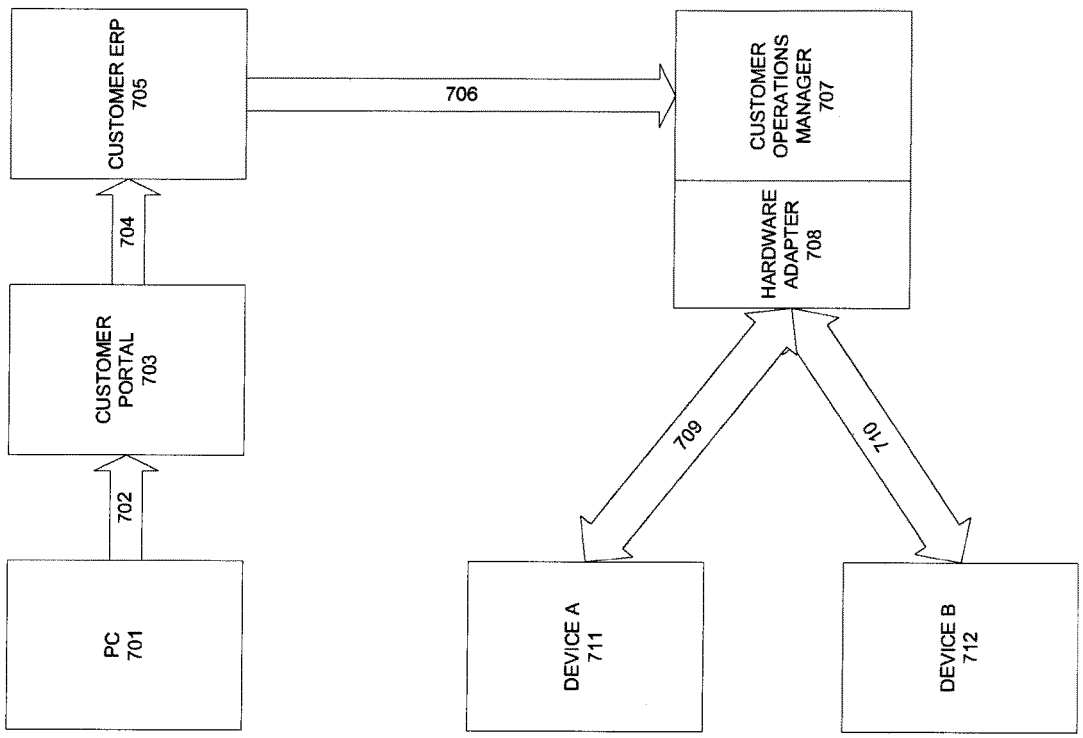
FIG. 7A illustrates an exemplary online device rehost, or transfer of capabilities, process for use with the present system, according to one embodiment.

FIG. 7A illustrates an exemplary online device rehost, or transfer of capabilities, process for use with the present system, according to one embodiment. A customer PC 701 requests 702 through the customer portal 703 to disable a device A 711 and to enable a device B 712. The request is communicated 704 to the ERP 705 and the transfer of capabilities information is then passed 706 to the customer operations manager 707. Device A 711 communicates 709 with the hardware adapter 708 on the customer operations manager 707. The communication 709 involves sending a capability request and receiving a capability response detailing the removal of capabilities on the device A 711. Device A 711 completes the disable transaction with a confirmation message to the hardware adapter 720. Device B 712 communicates 710 with the hardware adapter 708 on the customer operations capability response detailing the addition of device capabilities. No confirmation of capabilities received is necessary from device B 712 to the hardware adapter 720. Device B 712 functions with the new capabilities.

FIG. 7B illustrates an exemplary offline device rehost, or transfer of capabilities, process for use with the present system, according to one embodiment. A customer PC 713 requests 714 through the customer portal 715 to disable a device A 725 and to enable a device B 722. The request is communicated 716 to the customer ERP 717 and the transfer of capabilities information is then passed 718 to the customer operations manager 719. The hardware adapter 720 on the customer operations manager 719 communicates 721 with the customer portal 715, handling capability requests and sending capability responses detailing the adding and removal of capabilities on device A 725 and device B 722. In general, the capability response for adding capabilities for device B is generated after the confirmation message is received by the hardware adapter from device A. The customer portal 715 relays 714 the capability responses back to the customer PC 713. The customer PC 713 responds 724 to a device capability request from device A 725 with a disable capability response, and device A 725 completes the disable transaction with a confirmation message to the PC 713. The PC 713 communicates a capability response detailing the addition of device capabilities 723 to device B 722. No confirmation of capabilities received is necessary from device B 722. Device B 722 functions with the new capabilities.

Figure 8:
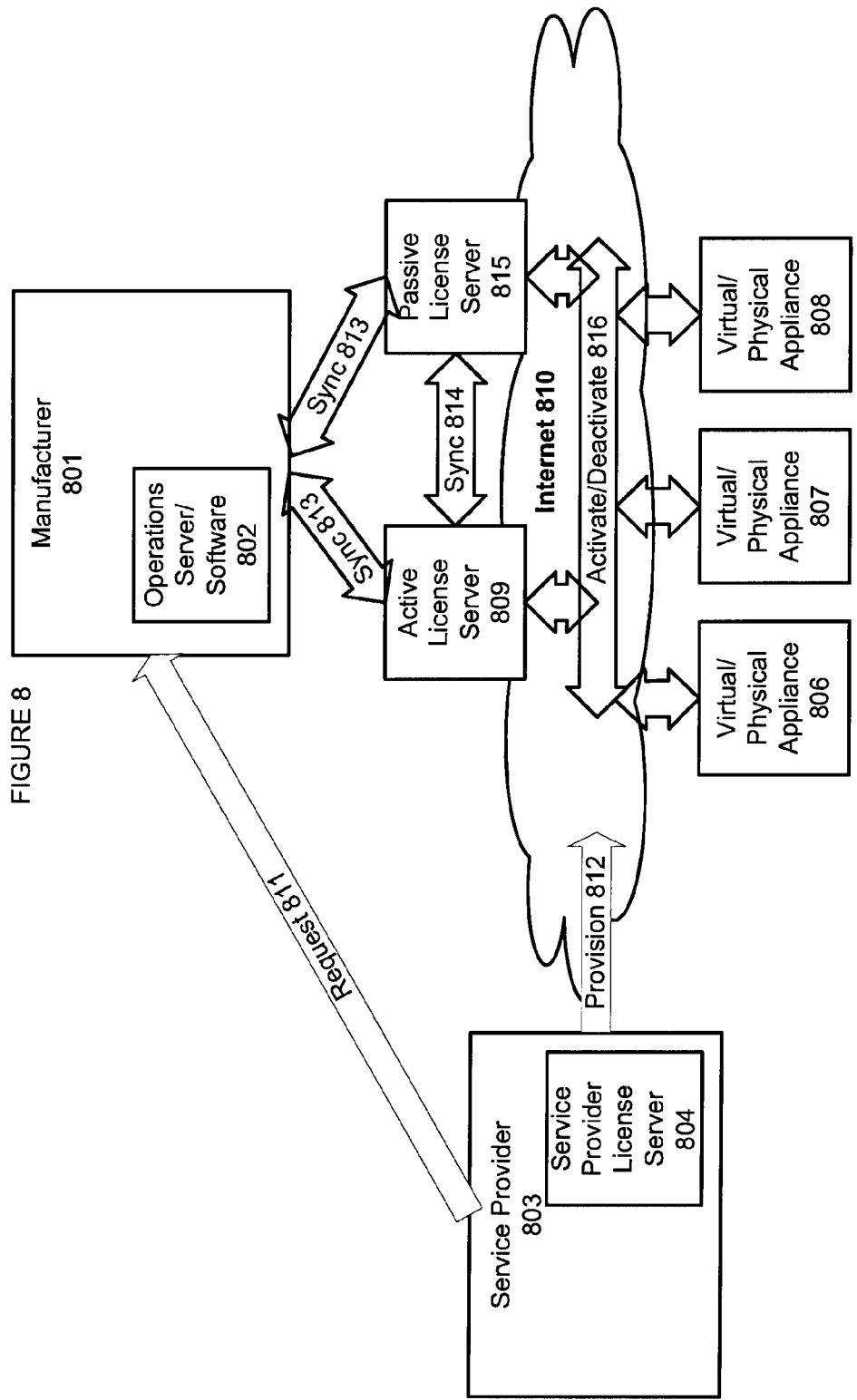
FIG. 8 illustrates an exemplary online provisioning process for use with the present system, according to one embodiment.

FIG. 8 illustrates an exemplary online provisioning process for use with the present system, according to one embodiment. In this process, a license server is connected to the internet and is able to communicate with an operations server. A service provider 803 having a license server 804 requests capability capacity from a manufacturer 801 having an operations server and/or software 802. Examples of a manufacturer 801 include device manufacturers such as Netgear and Apple. Examples of a service provider include a cable service provider such as Comcast, or a wireless communications provider such as AT&T. The service provider license server 804 then provisions 812 its virtual and/or physical appliances (806, 807, 808). Provisioning appliances includes deploying them to customers. Examples of virtual and/or physical appliances (806, 807, 808) include devices having multiple capabilities including gaming devices, video processing devices, base stations, digital cable receivers, routers and smart phones such as iPhones. The operations server 802 activates the requested capacity and communicates the active capacity by syncing 813 with the active license server 809. Active capacity, according to one embodiment, includes available licenses for device capabilities. The capabilities are then activated or deactivated 816 on the appropriate appliances (806, 807, 808) that are all connected to the internet 810. The activations are synchronized 813 between the operations server 802 and both the active license server 809 and the passive license server 815 so that the manufacturer 801 has information regarding capabilities available to activate on devices or appliances. The active license server 809 and passive license server 815 synchronize 814 for fail-over support of license provisioning, as a result the passive license server 815 is aware of what licenses have been activated on which devices or appliances.

Figure 9:
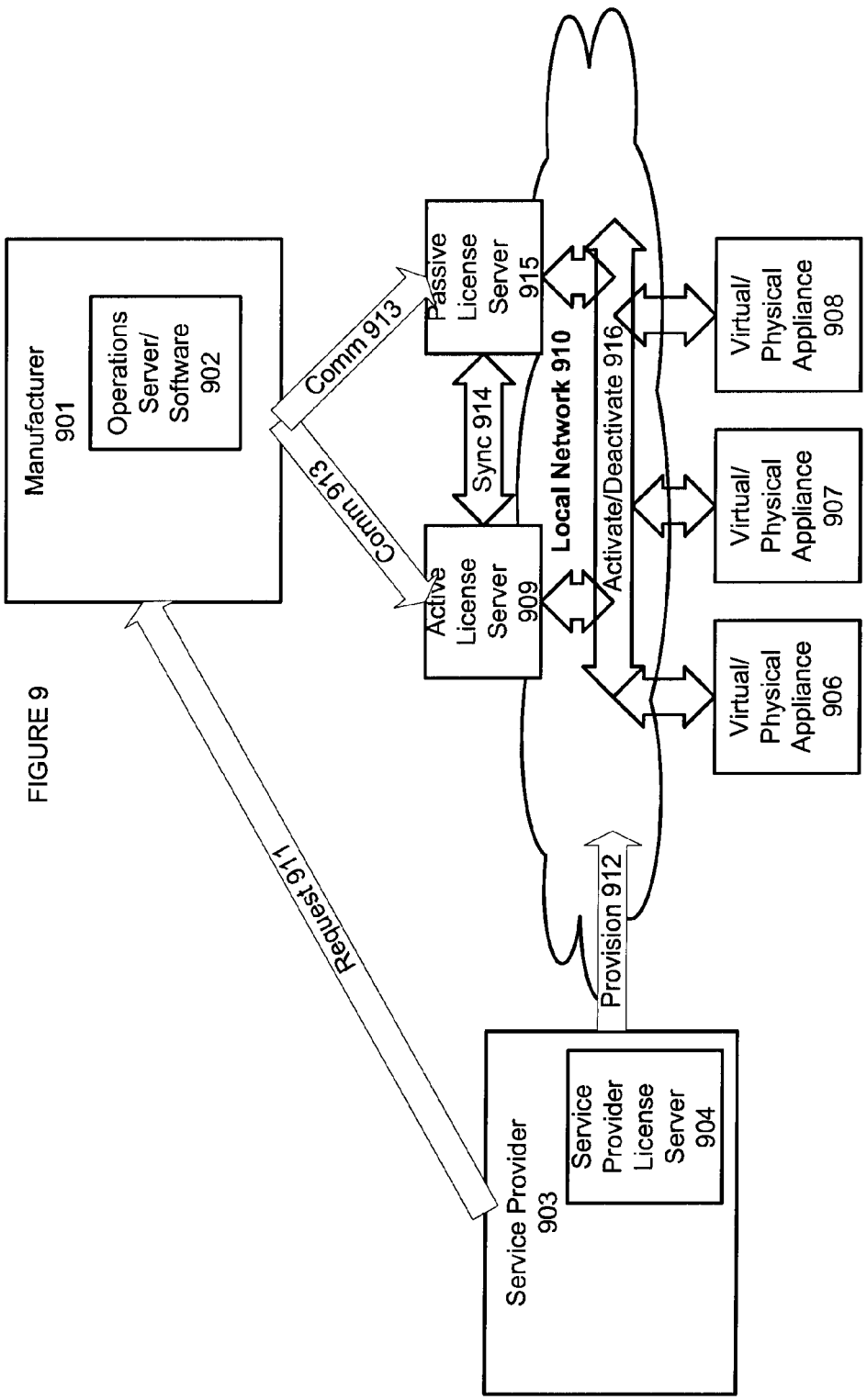
FIG. 9 illustrates an exemplary offline provisioning process for use with the present system, according to one embodiment.

FIG. 9 illustrates an exemplary offline provisioning process for use with the present system, according to one embodiment. In this process, a license server is not connected to the internet. A service provider 903 having a license server 904 requests capability capacity from a manufacturer 901 having an operations server and/or software 902. The service provider license server 904 then provisions 912 its virtual or physical appliances (906, 907, 908). Provisioning appliances includes deploying them to customers. The operations server 902 activates the requested capacity and communicates 913 the active capacity directly to the active license server 909 and the passive license server 915. The capabilities are then activated or deactivated 916 on the appropriate appliances (906, 907, 908) that are all connected to the local network 910. The active license server 909 and passive license server 915 synchronize 914 for fail-over support of license provisioning, as a result the passive license server 815 is aware of what licenses have been activated on which devices or appliances.

Figure 10:
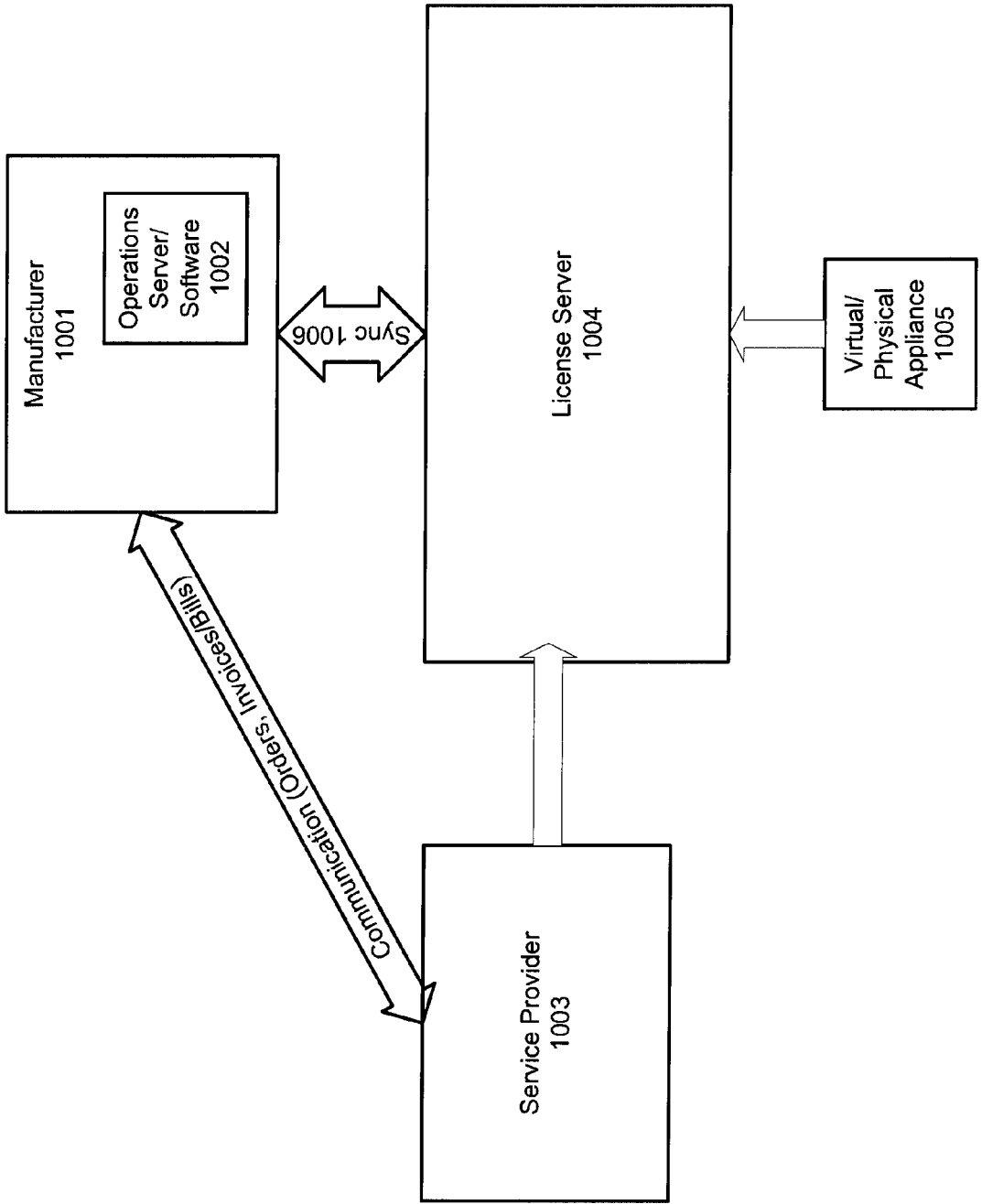
FIG. 10 illustrates an exemplary monetization process for use with the present system, according to one embodiment.

FIG. 10 illustrates an exemplary monetization process for use with the present system, according to one embodiment. A device manufacturer 1001, for example Netgear, has an operations server including operations management software 1002 according to the present system. The device manufacturer 1001 is in communication with a service provider 1003, for example AT&T, that has a license server 1004. An AT&T customer has received an appliance 1005 and desires particular capabilities. According to one embodiment, the service provider 1003 orders a capacity of capabilities to be enabled on multiple customer deployed appliances, and the device manufacturer 1001 activates the capacity accordingly and communicates to the license server 1004. The license server 1004 communicates with the appliances 1005 so that the license server 1004 is aware of deployed capacity.

According to one embodiment, capacity is not activated on the license server 1004 by the manufacturer 1001. Instead, the appliance 1005 communicates to the license server 1004 the deployed capacity (for example, the appliance may have 50 subscribers, or 100 subscribers, or 150 subscribers). The license server 1004 communicates the activated capacity to the manufacturer's server 1002 so that the manufacturer 1001 can appropriately invoice or bill the service provider 1003. This embodiment provides monetization for capability enablement tracking by a device manufacturer enabled via server synchronization appliance 1005 needs troubleshooting support from the manufacturer 1001, the manufacturer has the appliance 1005 information and capabilities stored (as opposed to the customer calling the service provider 1003 and being routed to the manufacturer 1001, and having to provide all hardware information to the manufacturer 1001 for support).

Figure 11:
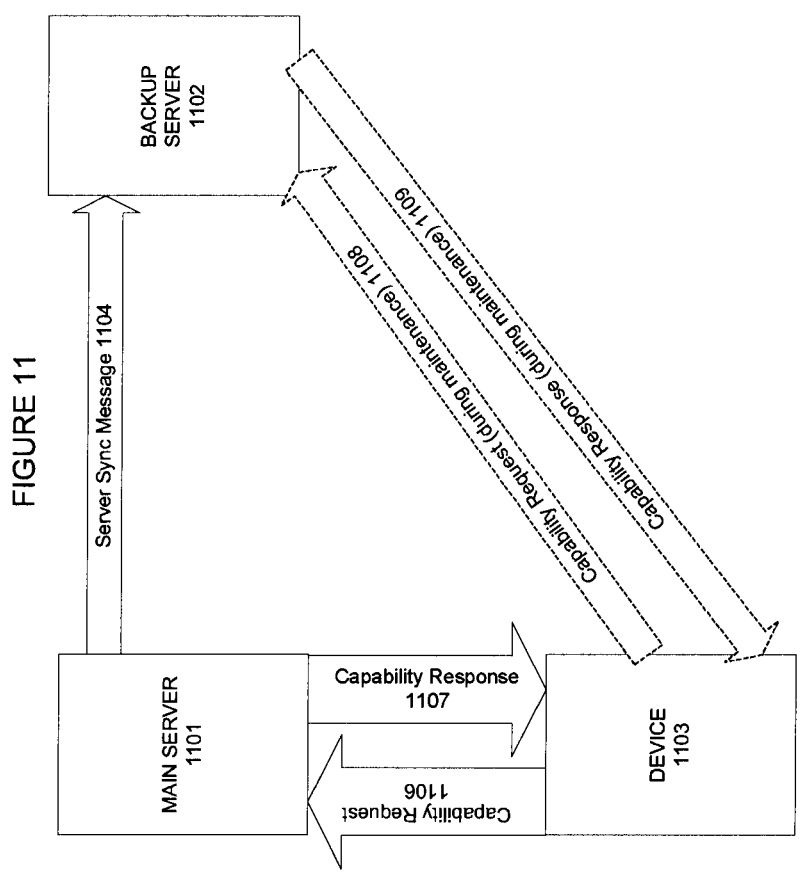
FIG. 11 illustrates an exemplary server to server synchronization process for use with the present system, according to one embodiment.

FIG. 11 illustrates an exemplary server to server synchronization process for use with the present system, according to one embodiment. In this process, a backup server takes over when a main server fails. When devices switch to the backup server, there are not changes in their licensing state because the backup server is synchronized with the main via sync messages. A backup server 1102 receives a server sync message 1104 message from a main server 1101. The main server 1101 receives capability requests 1106 from a device 1103 and responds with capability response messages 1107. If the main server 1101 is down for maintenance or fails for any reason, the device 1103 submits capability requests 1108 to the backup server 1102 and receives capability response messages 1109 from the backup server 1102.

Figure 12:
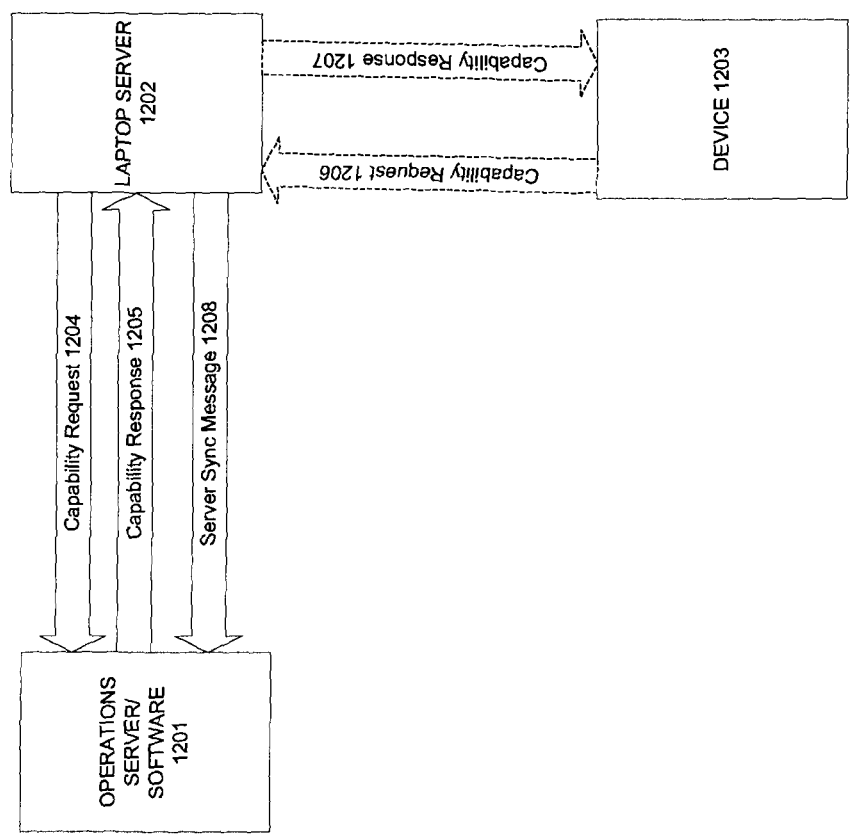
FIG. 12 illustrates an exemplary laptop server synchronization process for use with the present system, according to one embodiment.

FIG. 12 illustrates an exemplary laptop server synchronization process for use with the present system, according to one embodiment. This case is applicable when devices are offline. A laptop server 1202 submits a capability request 1204 to an operations server 1201 to load up available capacity for a plurality of devices. The laptop server 1202 receives a capability response 1205 message and can service a device 1203. The device 1203 submits a capability request 1206 to the laptop server 1202 and the laptop server 1202 responds with a capability response message 1207. The laptop server 1202 returns and provides a server sync message 1208 to the operations server 1201.

Figure 13:
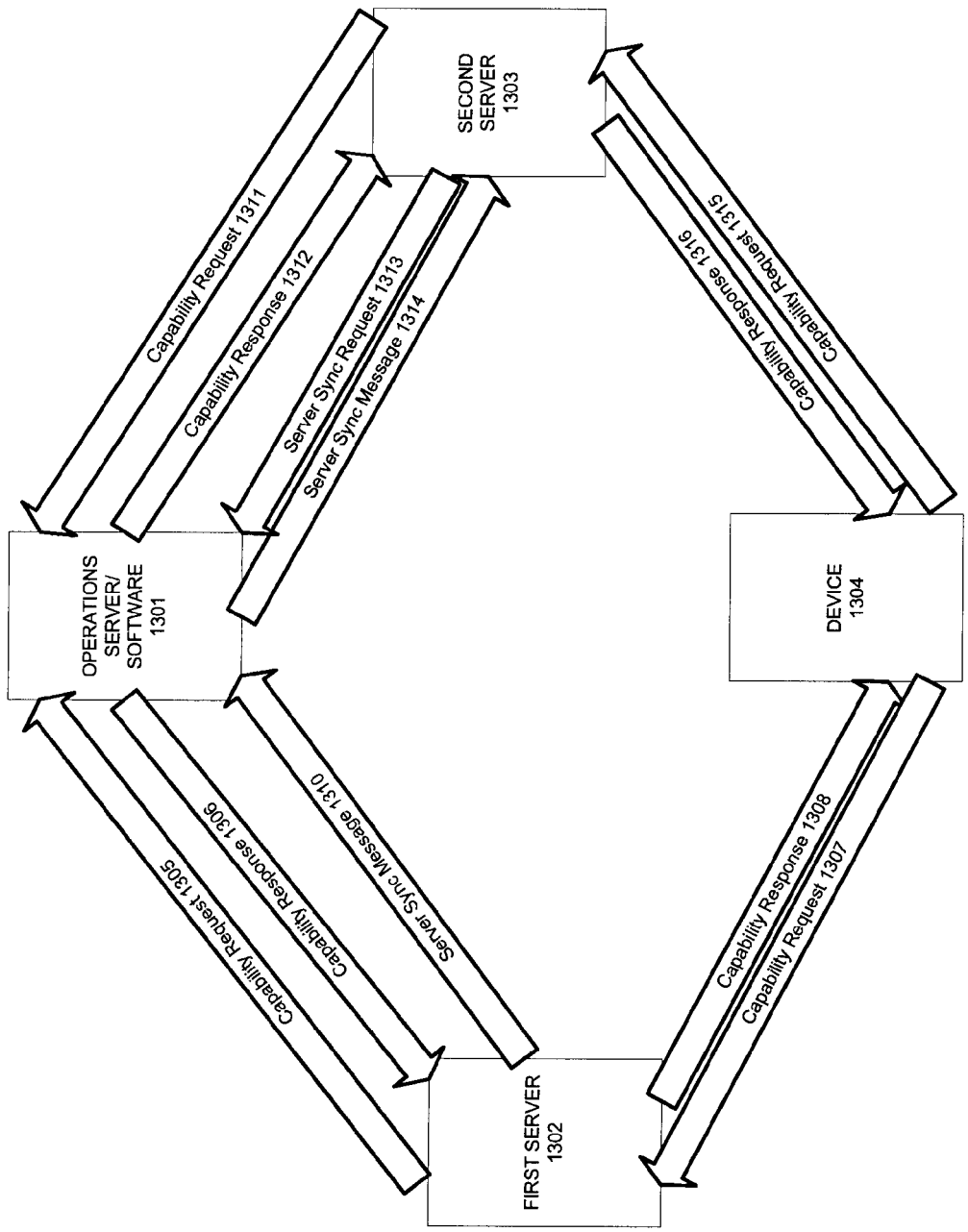
FIG. 13 illustrates an exemplary catastrophic server recovery synchronization process for use with the present system, according to one embodiment.

FIG. 13 illustrates an exemplary catastrophic server recovery synchronization process for use with the present system, according to one embodiment. According to one embodiment, catastrophic failure means that license distribution data cannot be recovered from a first server, but it can be replicated on a second server because licensing state was stored on an operations server. A first server 1302 receives a capability response message 1306 in response to a capability request 1305 from an operations server 1301. The operations server 1301 periodically receives from the first server 1302 a server sync message 1310. If the first server 1302 fails for any reason, a second server 1303 is deployed and receives available capability information through capability request 1311 to the operations server 1301 and capability response 1312 from the operations server 1301. The operations server 1301 receives a server sync request 1313 from the second server 1303 and responds with a server sync message 1314. The device 1304 submits capability requests 1307, 1315 and receives capability responses 1308, 1316 respectively.

FIG. 14 illustrates an exemplary device state restoration process for use with the present system, according to one embodiment. A server 1402 requests capabilities 1404 from an operations server 1401 and receives a capabilities response 1405. A device 1403 requests capabilities 1406 from the server 1402 and receives a capabilities response 1407. The operations server 1401 periodically receives from the server 1402 a server sync message 1409. In the event that the device 1403 fails, the device 1403 license state can be lost at the moment of failure. The device 1403 gets shipped to the device manufacturer 1410 for repair (or another reason in another scenario), the device state can be restored through a capabilities request 1411 transmitted from the device 1403 to the operations server 1401, and the device 1403 receives a capabilities response 1412 from the operations server 1401 so that it may be shipped back to a customer 1413 in its proper licensing capabilities state.

According to one embodiment, a license server stores information including license rights, devices, and debits of license rights made by devices (what capabilities, when the capabilities were granted and when they expire).

According to one embodiment, server sync messages can include one or more of the following items:
Message Type
Message Timestamp (time of message generation)
Vendor Name
Server Host Id (type+value)
Identity Name
Last Sync Time (timestamp)
Renew Interval
Borrow Interval
List of Devices.

According to one embodiment, device information can include one or more of the following items:
Device Host Id (type+value)
Device Type
Device Name
Last Update Time (timestamp)
Server Host Id (type+value)
Server Name
Marked For Delete
List Of Served Features.
List Of Overage Features.

According to one embodiment, feature information can include one or more of the following items:
Feature Id
Feature Name
Feature Version
Count
Expiration.

A method and system for license server synchronization have been disclosed. It is to be understood that the embodiments described herein are for the purpose of elucidation and should not be considered limiting the subject matter of the present patent. Various modifications, uses, substitutions, combinations, improvements, methods of productions without departing from the scope or spirit of the present invention would be evident to a person skilled in the art.

What is claimed is:

1. A method for license server synchronization, the method comprising:
receiving a first capability request sent from a licensing server to an operations server, the first capability request requesting capacity for one or more additional licenses defining one or more capabilities to which a licensed user is entitled to have activated on a licensed user device that already has one or more fulfilled capabilities;
said operations server activating the requested capacity by generating one or more additional licenses based on information from one or more databases in memory, the one or more databases storing licensing information regarding which capabilities the licensed user is entitled to activate on the licensed user device and which capabilities have already been fulfilled on the licensed user device;
said operations server transmitting a first capability response from the operations server to the licensing server, the first capability response indicating that the one or more capabilities to which the licensed user device is entitled under the license have been activated,
wherein the first capability response comprises a first timestamp and a first functions list of functions to enable on a licensed user device,
said operations server transmitting the first capability response to a backup licensing server, wherein the backup licensing server provides a second capability response to the licensed user device upon failure of the licensing server,
wherein the second capability response is provided to the licensed user device by the licensing server,
wherein the second capability response includes the one or more activated capabilities to which the licensed user device is entitled under the license as indicated by the first capability response and that have not yet been fulfilled,
wherein the second capability response comprises:
a second timestamp comprising a time when the response was generated,
a unique identifier identifying the licensed user device, the unique identifier based on a hardware identity of the licensed user device, and
a second functions list of functions to enable on the licensed user device, including a list of all products and features to which said licensed user device is entitled,
wherein said capability response is encoded and signed to allow the licensed device to verify its authenticity,
wherein the licensed user device only processes a capability response that matches its unique identifier,
wherein the timestamp in a capability response is compared to a most recently processed request's timestamp, and
wherein the licensed user device only processes responses that were generated later than a response that it has already processed,
wherein the second capability response overwrites information from a previous response to modify at least one existing capability on the licensed user device, and
wherein capabilities that the licensed user device already has to which the licensed user is not entitled under the license as indicated by the first capability response are deactivated based on the second capability response;
said operations server receiving a server synchronization message sent from the licensing server to the operations server, the server synchronization message based on the one or more activated capabilities that have not been previously fulfilled and deactivated capabilities included in the second capability response;
wherein the server synchronization message comprises a server identifier, a third timestamp, and a list of devices and capabilities enabled on each device of the list of devices,
wherein the third timestamp comprises a time of message generation, a last sync time, and a last update time; and
said operations server transmitting a request for payment from the operations server to a service provider, wherein the request for payment is generated based on the one or more activated capabilities that have not been previously fulfilled and deactivated capabilities included in the server synchronization message.

2. The method of claim 1, wherein the licensing server is a laptop computer, and wherein the licensed user device is offline.

3. The method of claim 1, wherein the licensed user device is one of a gaming device, a video processing device, a base station, a router, a digital cable receiver or a smart phone.

4. The method of claim 1, wherein the service provider is one of a wireless communications provider or a cable television provider.

5. The method of claim 1, wherein the licensed user device is a replacement device and further comprising verifying that an original device has released its capabilities before activating the capabilities on the replacement device.

6. A system for license server synchronization, comprising:
a service provider in communication with a licensing server, wherein the licensing server is in communication with a licensed user device that already has one or more fulfilled capabilities; and
a processor comprising an operations server in communication with the service provider and the licensing server, the operations server performing operations of:
said operations server receiving a first capability request from the licensing server, the first capability request requesting capacity for one or more additional licenses defining one or more capabilities to which a licensed user is entitled to have activated on the licensed user device,
said operations server activating the requested capacity by generating one or more additional licenses based on information from one or more databases in memory, the one or more databases storing licensing information regarding which capabilities the licensed user is entitled to activate on the licensed user device and which capabilities have already been fulfilled on the licensed user device,
said operations server transmitting a first capability response to the licensing server, the first capability response indicating that the one or more capabilities to which the licensed user device is entitled under the license have been activated,
wherein the first capability response comprises a first timestamp and a first functions list of functions to enable on a licensed user device,
said operations server transmitting the first capability response to a backup licensing server,
wherein the backup licensing server provides a second capability response to the licensed user device upon failure of the licensing server,
wherein a second capability response is provided to the licensed user device by the licensing server,
wherein the second capability response is provided in response to a second capability request sent by the licensed user device to the licensing server;
wherein the second capability response comprises:
a second timestamp comprising a time when the response was generated,
a unique identifier identifying the licensed user device, the unique identifier based on a hardware identity of the licensed user device, and
a second functions list of functions to enable on the licensed user device, including a list of all products and features to which said licensed user device is entitled, wherein said capability response is encoded and signed to allow the licensed device to verify its authenticity, wherein the licensed user device only processes a capability response that matches its unique identifier, wherein the timestamp in a capability response is compared to a most recently processed request's timestamp, and wherein the licensed user device only processes responses that were generated later than a response that it has already processed, wherein the second capability response includes the one or more activated capabilities to which the licensed user device is entitled under the license as indicated by the first capability response and that have not yet been fulfilled, wherein the second capability response overwrites information from a previous response to modify at least one existing capability on the licensed user device, and wherein capabilities that the licensed user device already has to which the licensed user is not entitled under the license as indicated by the first capability response are deactivated based on the second capability response, said operations server receiving a server synchronization message from the licensing server, the server synchronization message based on the one or more activated capabilities that have not been previously fulfilled and deactivated capabilities included in the second capability response;

wherein the server synchronization message comprises a server identifier, a third timestamp, and a list of devices and capabilities enabled on each device of the list of devices, wherein the third timestamp comprises a time of message generation, a last sync time, and a last update time; and said operations server transmitting a request for payment to a service provider, wherein the request for payment is generated based on the one or more activated capabilities that have not been previously fulfilled and deactivated capabilities included in the server synchronization message.

7. The system of claim 6, wherein the licensing server is a laptop computer, and wherein the licensed user device is offline.

8. The system of claim 6, wherein the licensed user device is one of a gaming device, a video processing device, a base station, a router, a digital cable receiver or a smart phone.

9. The system of claim 6, wherein the service provider is one of a wireless communications provider or a cable television provider.

10. A non-transitory computer-readable storage medium, having embodied thereon a program executable by a processor to perform a method for license server synchronization, the method comprising:

receiving a first capability request sent from a licensing server over a communication network, the first capability request requesting capacity for one or more additional licenses defining one or more capabilities to which a licensed user is entitled to have activated on a licensed user device that already has one or more fulfilled capabilities;

activating the requested capacity by generating one or more additional licenses based on information from one or more databases in memory, the one or more databases storing licensing information regarding which capabilities the licensed user is entitled to activate on the licensed user device and which capabilities have already been fulfilled on the licensed user device;

transmitting a first capability response to the licensing server over the communication network, the capability response indicating that the one or more capabilities to which the licensed user device is entitled under the license have been activated, wherein the first capability response comprises a first timestamp and a first functions list of functions to enable on a licensed user device, transmitting the first capability response to a backup licensing server, wherein the backup licensing server provides a second capability response to the licensed user device upon failure of the licensing server, wherein a second capability response is provided to the licensed user device by the licensing server, and wherein the second capability response is in response to a second capability request sent by the licensed user device to the licensing server, and wherein the second capability response includes the one or more activated capabilities to which the licensed user device is entitled under the license as indicated by the first capability response and that have not yet been fulfilled, wherein the second capability response overwrites information from a previous response to modify at least one existing capability on the licensed user device, and wherein the second capability response comprises:
 a second timestamp comprising a time when the response was generated,
 a unique identifier identifying the licensed user device, the unique identifier based on a hardware identity of the licensed user device, and
 a second functions list of functions to enable on the licensed user device, including a list of all products and features to which said licensed user device is entitled, wherein said capability response is encoded and signed to allow the licensed device to verify its authenticity, wherein the licensed user device only processes a capability response that matches its unique identifier, wherein the timestamp in a capability response is compared to a most recently processed request's timestamp, and wherein the licensed user device only processes responses that were generated later than a response that it has already processed, wherein capabilities that the licensed user device already has to which the licensed user is not entitled under the license as indicated by the first capability response are deactivated based on the second capability response;

receiving a server synchronization message sent from the licensing server, the server synchronization message based on the one or more activated capabilities that have not been previously fulfilled and deactivated capabilities included in the second capability response, wherein the server synchronization message comprises a server identifier, a third timestamp, and a list of devices and capabilities enabled on each device of the list of devices, wherein the third timestamp comprises a time of message generation, a last sync time, and a last update time; and transmitting a request for payment to a service provider, wherein the request for payment is generated based on the one or more activated capabilities that have not been previously fulfilled and deactivated capabilities included in the server synchronization message.

11. The non-transitory computer-readable storage medium of claim 10, wherein the licensed user device is a replacement device and wherein the program further comprises instructions for verifying that an original device has released its capabilities before activating the capabilities on the replacement device.

\* \* \* \* \*